(12) United States Patent
Lee et al.

(10) Patent No.: US 11,411,256 B2
(45) Date of Patent: Aug. 9, 2022

(54) BATTERY PACK

(71) Applicant: Samsung SDI Co., Ltd., Yongin-si (KR)

(72) Inventors: Eunjoong Lee, Yongin-si (KR); Miae Um, Yongin-si (KR); Daehyeong Yoo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 42 days.

(21) Appl. No.: 16/765,404

(22) PCT Filed: Nov. 6, 2018

(86) PCT No.: PCT/KR2018/013361
§ 371 (c)(1),
(2) Date: May 19, 2020

(87) PCT Pub. No.: WO2019/112187
PCT Pub. Date: Jun. 13, 2019

(65) Prior Publication Data
US 2020/0335832 A1    Oct. 22, 2020

(30) Foreign Application Priority Data
Dec. 4, 2017    (KR) ........................ 10-2017-0165227

(51) Int. Cl.
*H01M 10/42*    (2006.01)
*H01M 50/20*    (2021.01)
(Continued)

(52) U.S. Cl.
CPC ..... *H01M 10/425* (2013.01); *H01M 10/4207* (2013.01); *H01M 50/20* (2021.01);
(Continued)

(58) Field of Classification Search
CPC . H01M 10/42; H01M 10/425; H01M 10/4207
See application file for complete search history.

(56) References Cited

U.S. PATENT DOCUMENTS

| | | | |
|---|---|---|---|
| 2011/0123838 A1* | 5/2011 | Lee | ............. H01M 50/581 429/7 |
| 2013/0089755 A1 | 4/2013 | Park et al. | |

(Continued)

FOREIGN PATENT DOCUMENTS

| | | |
|---|---|---|
| JP | 5610645 B2 | 10/2014 |
| KR | 10-2011-0056698 A | 5/2011 |

(Continued)

OTHER PUBLICATIONS

European Search Report Corresponding to EP Application No. 18886243.7, dated Sep. 16, 2021, 7 pages.

(Continued)

*Primary Examiner* — Karie O'Neill Apicella
(74) *Attorney, Agent, or Firm* — Lewis Roca Rothgerber Christie LLP

(57) ABSTRACT

A battery pack includes: a battery cell including an electrode assembly connected to an electrode tab, and first and second casings facing each other and coupled to each other to form an accommodation portion accommodating the electrode assembly and to form a terrace portion extending across the electrode tab to seal the accommodation portion, the terrace portion including a first surface on the first casing and a second surface on the second casing; a protective circuit module electrically connected to the battery cell and on the first surface of the terrace portion; and a current breaking device electrically connected to the protective circuit module to form a charge-discharge path of the battery cell and on the second surface of the terrace portion. The current breaking device limits charge-discharge current in response to the (Continued)

battery cell's abnormal state such as overheating, and does not spatially interfere with the protective circuit module.

19 Claims, 6 Drawing Sheets

(51) Int. Cl.
  *H01M 50/531* (2021.01)
  *H01M 50/572* (2021.01)
(52) U.S. Cl.
  CPC ....... *H01M 50/531* (2021.01); *H01M 50/572* (2021.01); *H01M 2010/4271* (2013.01); *H01M 2200/00* (2013.01)

(56) References Cited

U.S. PATENT DOCUMENTS

| | | | |
|---|---|---|---|
| 2013/0122329 A1 | 5/2013 | Park et al. | |
| 2014/0212701 A1 | 7/2014 | Hur | |
| 2015/0093603 A1 | 4/2015 | Won et al. | |
| 2015/0162650 A1 | 6/2015 | Ahn et al. | |
| 2015/0357689 A1* | 12/2015 | Park | H01M 50/543 429/120 |
| 2016/0218533 A1 | 7/2016 | Lim et al. | |
| 2017/0155257 A1* | 6/2017 | Kim | H01M 50/209 |

FOREIGN PATENT DOCUMENTS

| | | |
|---|---|---|
| KR | 10-2013-0053000 A | 5/2013 |
| KR | 10-2013-0067979 A | 6/2013 |
| KR | 10-2014-0096974 A | 8/2014 |
| KR | 10-2015-0037678 A | 4/2015 |
| KR | 10-2015-0065280 A | 6/2015 |
| KR | 10-1539690 B1 | 7/2015 |
| KR | 10-2017-0006647 A | 1/2017 |
| KR | 10-2017-0062976 A | 6/2017 |

OTHER PUBLICATIONS

Korean Office Action, Corresponding Application No. 10-2017-0165227, dated Apr. 27, 2022, 6 pps.

* cited by examiner

BATTERY PACK

CROSS-REFERENCE TO RELATED APPLICATION(S)

This application is a National Phase Patent Application of International Patent Application Number PCT/KR2018/013361, filed on Nov. 6, 2018, which claims priority of Korean Patent Application No. 10-2017-0165227, filed Dec. 4, 2017. The entire contents of both of which are incorporated herein by reference.

TECHNICAL FIELD

The present disclosure relates to a battery pack.

BACKGROUND ART

In general, secondary batteries refer to batteries that can be repeatedly charged and recharged unlike non-rechargeable primary batteries. Secondary batteries are used as energy sources of devices such as mobile devices, electric vehicles, hybrid electric vehicles, electric bicycles, and uninterruptible power supplies. Single-cell secondary batteries or battery packs each including a plurality of cells connected to each other as a unit are used according to the types of devices that employ secondary batteries.

Small mobile devices such as cellular phones may be operated for a predetermined time using single-cell secondary batteries. However, battery packs having high-output, high-capacity features may be suitable for devices having long operating times and consuming large amounts of power such as electric vehicles and hybrid electric vehicles. The output voltages or currents of battery packs may be increased by adjusting the number of battery cells included in the battery packs.

Such a battery pack may include: a protective circuit module configured to collect state information such as voltage and temperature from battery cells and control the charge-discharge operations of the battery cells; and a current breaking device electrically connected to the protective circuit module and configured to detect abnormal operations such as overheating of the battery cells and take protective measures.

DESCRIPTION OF EMBODIMENTS

Technical Problem

An embodiment of the present disclosure provides a battery pack including: a protective circuit module forming a charge-discharge path of a battery cell; and a current breaking device configured to limit charge-discharge current in response to an abnormal state of the battery cell such as overheating of the battery cell, wherein the protective circuit module and the current breaking device do not spatially interfere with each other, and the battery pack is advantageous for compactness.

Solution to Problem

A battery pack includes:
a battery cell including an electrode assembly to which an electrode tab may be connected, and first and second casings which face each other and may be coupled to each other to form an accommodation portion accommodating the electrode assembly and form a terrace portion extending across the electrode tab to seal the accommodation portion, the terrace portion including a first surface on the first casing and a second surface on the second casing;
a protective circuit module electrically connected to the battery cell and arranged on the first surface of the terrace portion; and
a current breaking device electrically connected to the protective circuit module and arranged on the second surface of the terrace portion.

Advantageous Effects of Disclosure

According to the present disclosure, the protective circuit module, which forms the charge-discharge path of the battery cell, and the current breaking device, which is configured to limit charge-discharge current in response to an abnormal state such as overheating of the battery cell, are respectively arranged on opposite surfaces of the terrace portion, thereby fundamentally preventing spatial interference between the protective circuit module and the current breaking device, making it unnecessary to additionally form a hole or groove in the protective circuit module for preventing interference between the protective circuit module and the current breaking device, decreasing the width of the protective circuit module, and enabling the battery pack to have a compact structure.

BEST MODE

Figure 1:
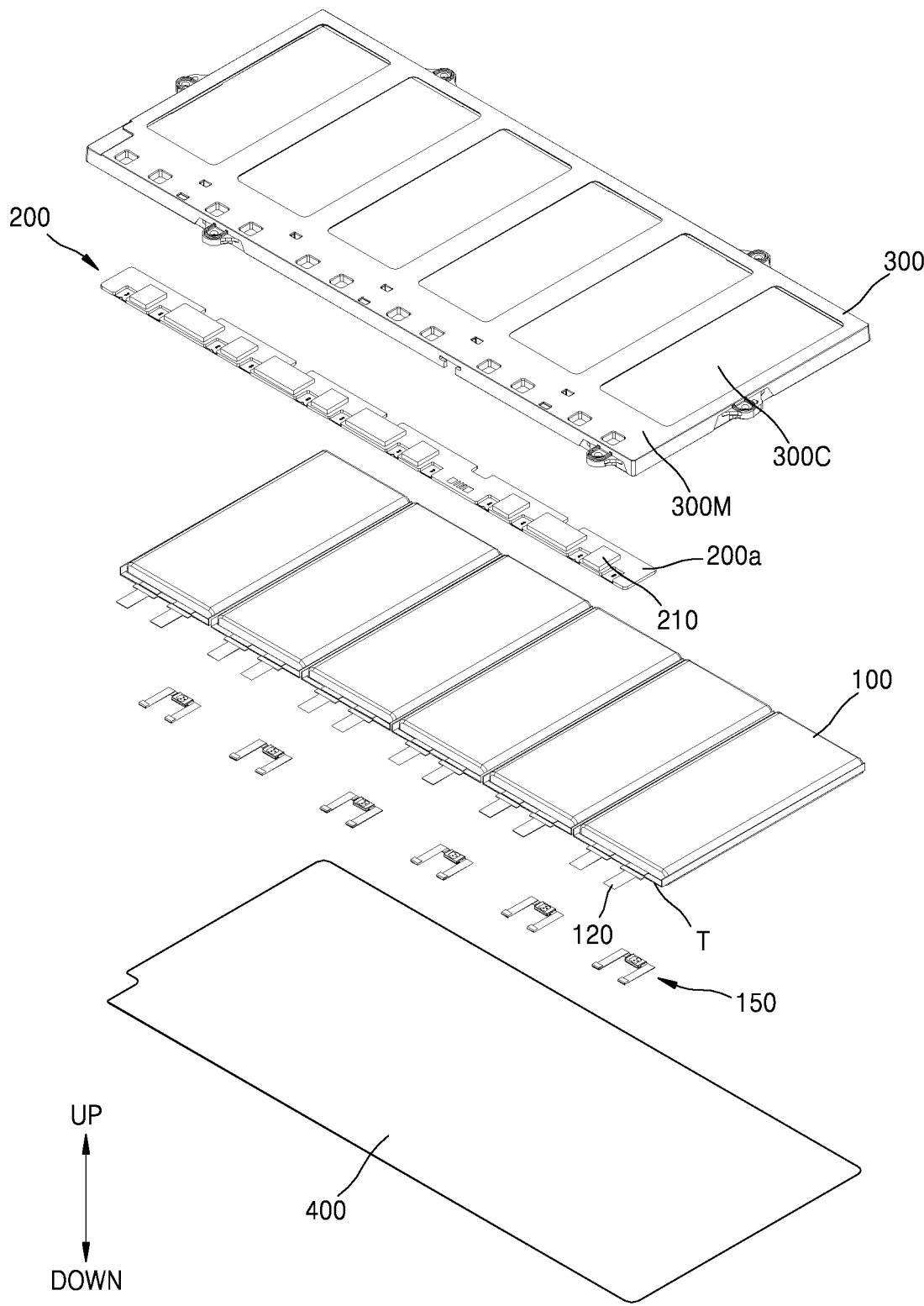
FIG. 1 is an exploded perspective view illustrating a battery pack according to an embodiment of the present disclosure.

A battery pack includes:
a battery cell including an electrode assembly to which an electrode tab may be connected, and first and second casings which face each other and may be coupled to each other to form an accommodation portion accommodating the electrode assembly and form a terrace portion extending across the electrode tab to seal the accommodation portion, the terrace portion including a first surface on the first casing and a second surface on the second casing;
a protective circuit module electrically connected to the battery cell and arranged on the first surface of the terrace portion; and
a current breaking device electrically connected to the protective circuit module and arranged on the second surface of the terrace portion.

For example, the first and second casings may respectively include first and second accommodation portions to accommodate different portions of the electrode assembly.

For example, the first accommodation portion may have a greater thickness than the second accommodation portion.

For example, the current breaking device and the protective circuit module may face each other with the terrace portion therebetween.

For example, the current breaking device may be electrically connected to the protective circuit module through a connection member.

For example, the connection member may extend from the current breaking device to a position outside the terrace portion.

For example, the protective circuit module may be arranged on the first surface of the terrace portion and may extend to the position outside the terrace portion.

For example, the connection member and the protective circuit module may be connected to each other at the position outside the terrace portion.

For example, the current breaking device may include a main body and first and second leads connected to each other through the main body, and the connection member may include first and second connection members respectively connected to the first and second leads.

For example, the electrode tab may include first and second electrode tabs having different polarities, the first connection member may be arranged outside the first and second electrode tabs which are provided as a pair, and the second connection member may be arranged between the first and second electrode tabs.

For example, the first and second connection members may extend side by side in an extending direction of the electrical tab from the first and second leads of the current breaking device to positions outside the terrace portion.

For example, the protective circuit module may have a lateral side which faces the protective circuit module and is flat.

For example, the battery cell may include a plurality of battery cells, and the protective circuit module may extend across the plurality of battery cells and may be electrically connected to each of the plurality of battery cells.

For example, the protective circuit module may extend along terrace portions of the plurality of battery cells and may be electrically connected to an electrode tab extending outward from the terrace portion of each of the plurality of battery cells.

For example, the electrode tab may include first and second electrode tabs having different polarities, and the first and second electrode tabs may extend outward from the terrace portion and may be connected to the protective circuit module.

For example, the protective circuit module may include first and second connection tabs which are coupled, in an overlapping manner, to the first and second electrode tabs extending outward from the terrace portion and are exposed to an outside through coupling holes.

For example, the current breaking device may be connected along a charge-discharge path of the battery cell to limit or break the charge-discharge path when the battery cell malfunctions.

Mode of Disclosure

Hereinafter, a battery pack will be described according to preferred embodiments of the present disclosure with reference to the accompanying drawings.

FIG. 1 is an exploded perspective view illustrating a battery pack according to an embodiment of the present disclosure.

Referring to the drawing, the battery pack may include battery cells 100 and a protective circuit module 200 electrically connected to the battery cells 100 for controlling charge and discharge operations of the battery cells 100. In addition, the battery pack may include: a frame 300 for accommodating the battery cells 100 and the protective circuit module 200 together; and a cover 400 placed on the frame 300 and coupled to the frame 300 in mutually-facing directions for covering the battery cells 100 and the protective circuit module 200 together.

The frame 300 may include: cell accommodation portions 300C on which the battery cells 100 are arranged; and a circuit accommodation portion 300M on which the protective circuit module 200 is placed at a position adjacent to the cell accommodation portions 300C. The protective circuit module 200 may extend in a direction crossing the battery cells 100 and may be electrically connected to the battery cells 100, and the circuit accommodation portion 300M on which the protective circuit module 200 is placed may be formed at a position facing the cell accommodation portions 300C on which the battery cells 100 are respectively placed.

In an embodiment of the present disclosure, the number of the battery cells 100 may be two or more, and the two or more battery cells 100 may be electrically connected to each other through the protective circuit module 200. For example, the protective circuit module 200 may be electrically connected to each of the battery cells 100 and may include a conductive pattern (not shown) for providing a charge-discharge path connected to each of the battery cells 100. For example, the protective circuit module 200 may include a circuit board 200a, a conductive pattern (not shown) formed on the circuit board 200a, and a plurality of circuit elements 210 mounted on the circuit board 200a.

For example, the protective circuit module 200 may extend in a direction crossing the battery cells 100 and may be electrically connected to each of the battery cells 100. For example, the protective circuit module 200 may extend along terrace portions T of the battery cells 100 and may be electrically connected to electrode tabs 120 extending outward from the terrace portions T. In addition, the protective circuit module 200 may collect charge-discharge currents through the electrode tabs 120 and may deliver the currents to an external circuit (not shown).

Figure 2:
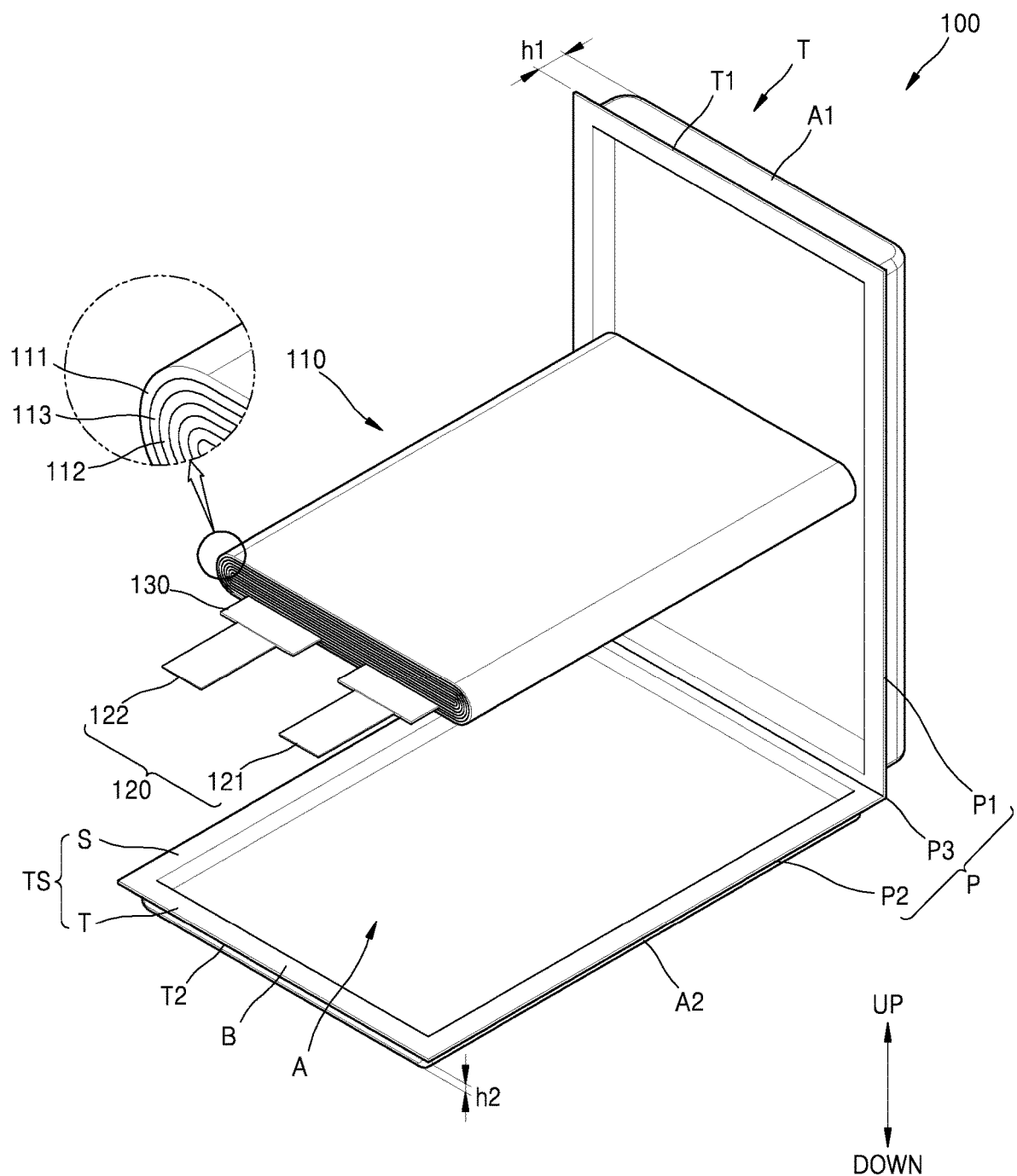
FIG. 2 is a perspective view illustrating the battery pack shown in FIG. 1.
Figure 3:
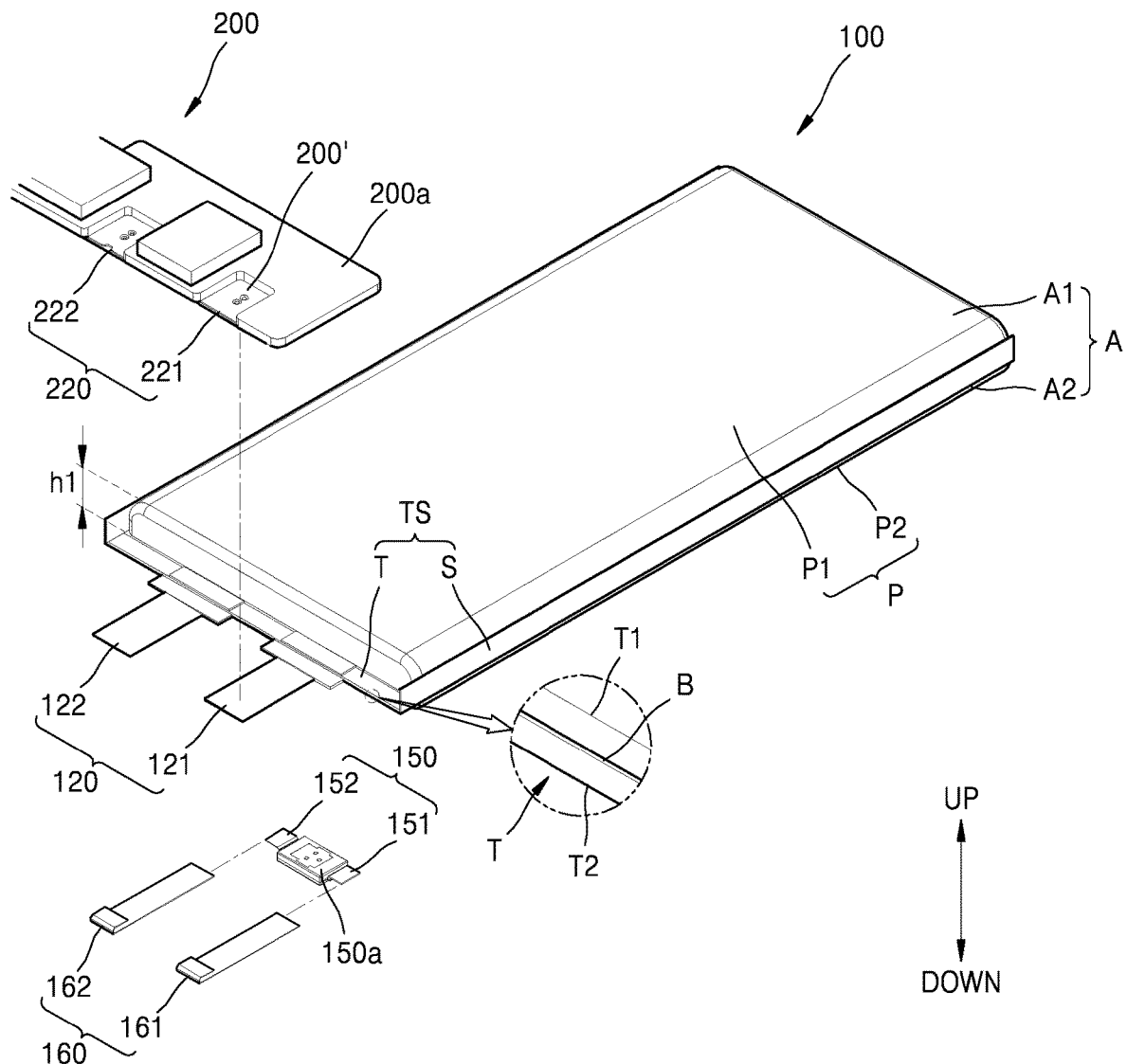
FIG. 3 is an enlarged exploded perspective view illustrating a portion of the battery pack shown in FIG. 1.
Figure 4:
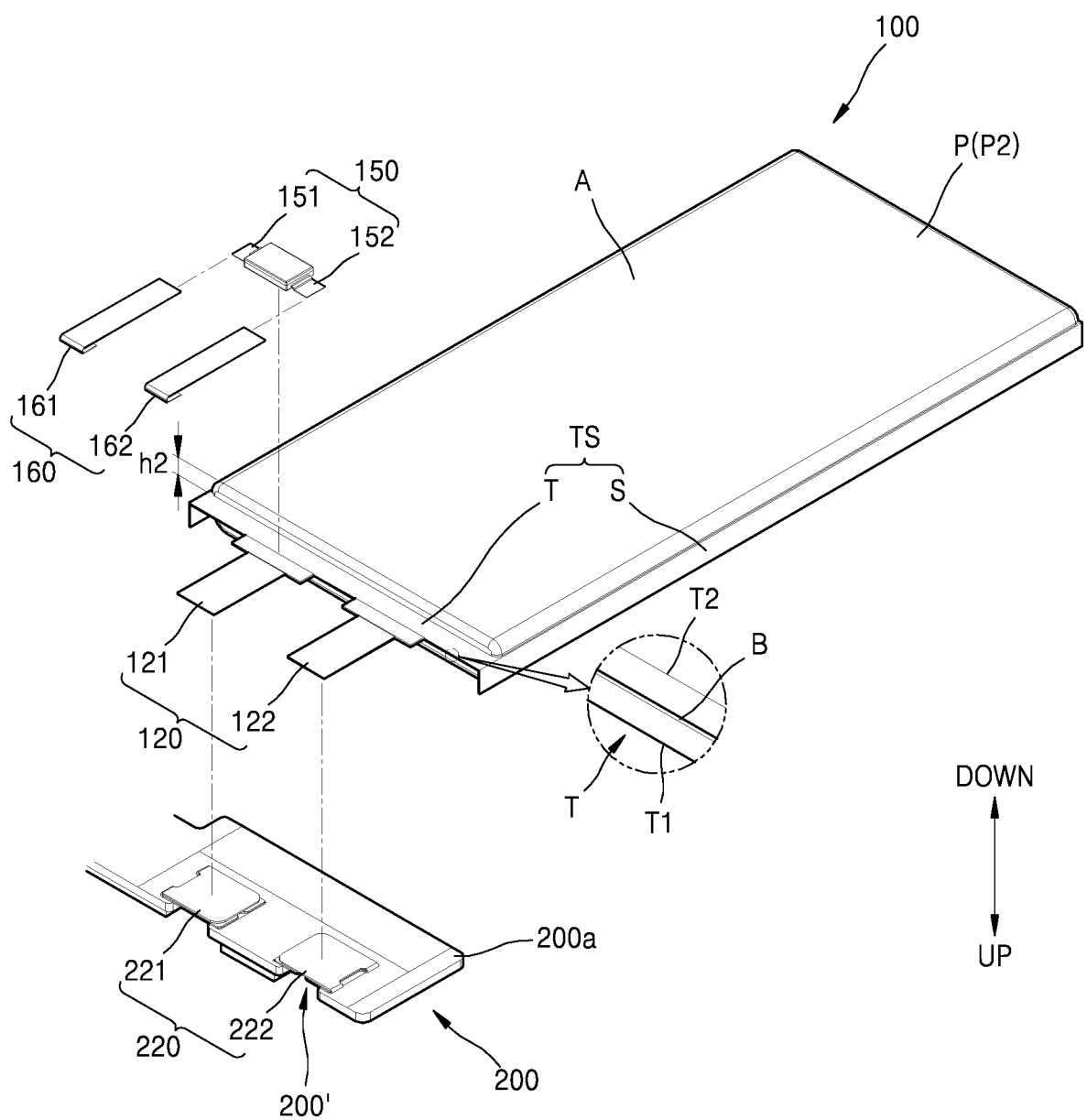
FIGS. 4 and 5 are an exploded perspective view and a perspective view which illustrate, in a different direction, the portion of the battery pack shown in FIG. 3.
Figure 5:
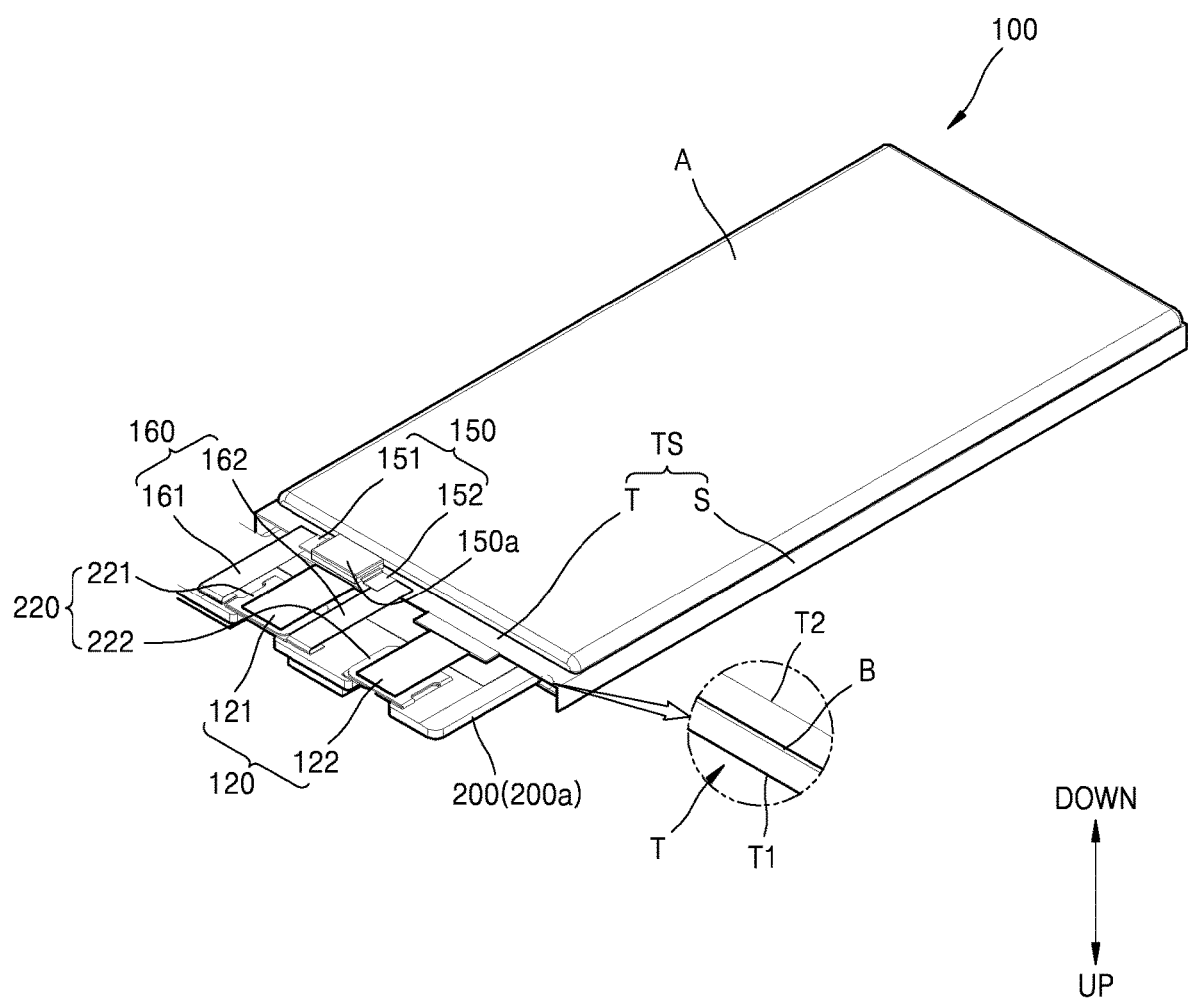

FIG. 2 is a perspective view illustrating a battery cell shown in FIG. 1. FIG. 3 is an exploded perspective view illustrating a portion of the battery pack shown in FIG. 1. FIGS. 4 and 5 are an exploded perspective view and a perspective view which illustrate, in a different direction, the portion of the battery pack shown in FIG. 3.

Referring to the drawings, the battery cell 100 may include an electrode assembly 110 and a casing P which seals the electrode assembly 110. The electrode assembly 110 may include: first and second electrode plates 111 and 112 having opposite polarities; and a separator 113 arranged between the first and second electrode plates 111 and 112, wherein the electrode assembly 110 may be formed as a wound-type electrode assembly in which the first and second electrode plates 111 and 112 are wound in a roll shape with the separator 113 therebetween, or the electrode assembly 110 may be formed as a stacked-type electrode assembly in which a plurality of first electrode plates 111 and a plurality of second electrode plates 112 are stacked with separators 113 therebetween.

Electrode tabs 120 may be connected to the electrode assembly 110. That is, the electrode tabs 120 may be electrically connected to the electrode assembly 110 and may extend outward from the casing P which surrounds the electrode assembly 110. The electrode tabs 120 may extend outward from a terrace portion T of the casing P. More specifically, the electrode tabs 120 may include first and second electrode tabs 121 and 122 having different polarities and electrically respectively connected to the first and second electrode plates 111 and 112. Insulating tapes 130 may be attached to the electrode tabs 120 to provide electrical insulation and sealing between the electrode tabs 120 and the casing P.

The casing P may be a flexible casing such as a pouch. The casing P may include insulating layers (not shown) formed on both sides of a thin metal layer (not shown) such as a thin aluminum layer, and may be formed through a forming process such as drawing.

The casing P may include first and second casings P1 and P2 coupled to each other in mutually-facing directions with the electrode assembly 110 therebetween. The casing P may include a folding portion P3 which is foldable to superpose the first and second casings P1 and P2 onto each other, and the first and second casings P1 and P2 may be folded along the folding portion P3 in mutually-facing directions to form the casing P in which the electrode assembly 110 is accommodated. More specifically, an accommodation portion (A) in which the electrode assembly 110 is accommodated, and a sealing portion TS sealing the accommodation portion (A) may be formed by folding the first and second casings P1 and P2 onto each other with the electrode assembly 110 therebetween. The sealing portion TS may be formed along the outer periphery of the accommodation portion (A) to seal the accommodation portion (A) in which the electrode assembly 110 is accommodated. For example, the sealing portion TS may be formed along sides of the casing P except for a side of the casing P on which the folding portion P3 is formed. For example, the casing P may be formed in a parallelepiped shape having a pair of opposing short sides and a pair of opposing long sides by joining together the first and second casings P1 and P2, and in this case, the sealing portion TS may be continuously formed along a short side and the pair of long sides except for a short side along which the folding portion P3 is formed.

The sealing portion TS may include: a terrace portion T through which the electrode tabs 120 electrically connected to the electrode assembly 110 are drawn out; and side sealing portions S which are in contact with the terrace portion T and extend in a direction crossing the terrace portion T. For example, the terrace portion T may be formed on a short side of the casing P, and the side sealing portions S may be formed on the pair of long sides of the casing P. That is, the terrace portion T may seal the accommodation portion (A) while extending in a direction crossing the electrode tabs 120, and the side sealing portions S may seal the accommodation portion (A) while extending in a direction crossing the terrace portion T. The terrace portion T and the side sealing portions S may be in contact with each other to form the sealing portion TS which extends continuously, and may thus seal the accommodation portion (A) together.

The sealing portion TS may be formed by folding the first and second casings P1 and P2 in mutually-facing directions to join the first and second casings P1 and P2 together. In this case, the terrace portion T of the sealing portion TS may include: a first surface T1 on the first casing P1 and a second surface T2 on the second casing P2 as outer surfaces; and sealing surfaces B which are adjoining inner surfaces of the first and second casings P1 and P2 between the first surface T1 and the second surface T2.

The first and second casings P1 and P2 may include first and second accommodation portions A1 and A2 that respectively accommodate different portions of the electrode assembly 110, and the accommodation portion (A) in which the electrode assembly 110 is completely accommodated may be provided as the first and second casings P1 and P2 are coupled to each other. For example, the accommodation portion (A) for the electrode assembly 110 may be formed by connecting the first and second accommodation portions A1 and A2 of the first and second casings P1 and P2 to each other. For example, the first accommodation portion A1 may accommodate a portion of the electrode assembly 110, and the second accommodation portion A2 may accommodate the remaining portion of the electrode assembly 110.

The first and second accommodation portions A1 and A2 may be formed to have different thicknesses h1 and h2. Here, the thicknesses h1 and h2 of the first and second accommodating portions A1 and A2 may be measured in the thickness direction of the electrode assembly 110, respectively from the first surface T1 and the second surface T2 of the terrace portion T. The thickness h1 of the first accommodation portion A1 may be greater than the thickness h2 of the second accommodation portion A2 such that the volume of the first accommodation portion A1 may be greater than the volume of the second accommodation portion A2, and the first accommodation portion A1 may accommodate a larger volume than the second accommodation portion A2. Since the thickness h1 of the first accommodation portion A1 is greater than the thickness h2 of the second accommodation portion A2, the protective circuit module 200 having a relatively large thickness may be mounted on the first surface T1 of the terrace portion T, and a current breaking device 150 having a relatively small thickness may be arranged on the second surface T2 of the terrace portion T. As described above, since the protective circuit module 200 and the current breaking device 150 having different thicknesses are respectively arranged on the first surface T1 and the second surface T2 of the terrace portion T, the thicknesses of the protective circuit module 200 and the current breaking device 150 may not exceed and protrude from the thicknesses h1 and h2 of the first and second accommodation portions A1 and A2, and the battery pack may have a small thickness.

Referring to FIG. 3, the protective circuit module 200 may be placed on the first surface T1 of the terrace portion T. More specifically, the protective circuit module 200 may be placed on the first surface T1 of the terrace portion T above the electrode tabs 120 extending outward from the terrace portion T and may be electrically connected to the electrode tabs 120. In this case, the protective circuit module 200 may include connection tabs 220 which overlap the electrode tabs 120 respectively at the positions of the electrode tabs 120 and make electrical connection with the electrode tabs 120. The connection tabs 220 may include first and second connection tabs 221 and 222 which respectively make electrical connection with the first and second electrode tabs 121 and 122. The connection tabs 220 and the electrode tabs 120 may be welded together in a state in which the connection tabs 220 overlap the electrode tabs 120, and to this end, the connection tabs 220 may be exposed to the outside through coupling holes 200' of the protective circuit module 200. The connection tabs 220 and the electrode tabs 120 may be exposed to the outside of the protective circuit module 200 through the coupling holes 200' in a state in which the connection tabs 220 overlap the electrode tabs 120, and may be welded together by laser welding.

The protective circuit module 200 may be electrically connected to the current breaking device 150. The current breaking device 150 may include a variable resistor having resistance varying with the temperature of the battery cell 100. For example, the current breaking device 150 may be connected along the charge-discharge path of the battery cell 100 and may suppress charge-discharge current or break the path of the charge-discharge current depending on the temperature of the battery cell 100. For example, the current breaking device 150 may be thermally connected to the battery cell 100 to detect overheating of the battery cell 100, and may be electrically connected to the protective circuit module 200, which forms the charge-discharge path of the battery cell 100, to break the charge-discharge path when the battery cell 100 malfunctions.

The current breaking device 150 may include: a main body 150a including a variable resistor; and first and second leads 151 and 152 connected to each other through the main body 150a. The main body 150a of the current breaking device 150 may be in contact with the battery cell 100 to detect overheating of the battery cell 100, and the first and second leads 151 and 152 of the current breaking device 150 may be electrically connected to the protective circuit module 200 such that the main body 150a including the variable resistor may be included in the charge-discharge path.

As long as the current breaking device 150 is capable of limiting or interrupting charge-discharge current depending on the temperature of the battery cell 100, the current breaking device 150 is not limited to the above-described structure, but may have any structure and may include a thermal cutoff (TCO) device, a positive temperature coefficient (PTC) device, a fuse, or the like.

Since the current breaking device 150 needs to be sensitive to the temperature of the battery cell 100, the current breaking device 150 may be arranged on the terrace portion T through which the electrode tabs 120 extend outward from the electrode assembly 110. More specifically, the current breaking device 150 may be arranged on the second surface T2 of the terrace portion T.

The current breaking device 150 may be arranged on a side which is opposite the protective circuit module 200 with the terrace portion T therebetween. More specifically, the protective circuit module 200 may be arranged on the first surface T1 of the terrace portion T, and the current breaking device 150 may be arranged on the second surface T2 of the terrace portion T. As described above, the protective circuit module 200 and the current breaking device 150 are respectively arranged on the first and second surfaces T1 and T2 of the terrace portion T which are opposite each other, thereby avoiding limitations caused by the narrow mounting space of the terrace portion T and preventing the problem occurring when the protective circuit module 200 and the current breaking device 150 are arranged together on the same side of the terrace portion T, for example, on the first surface T1 of the terrace portion T, that is, the problem in which the size of the protective circuit module 200 is increased because the conductive pattern (not shown) of the protective circuit module 200 forming the charge-discharge path is designed around the current breaking device 150 to avoid spatial interference between the protective circuit module 200 and the current breaking device 150.

The current breaking device 150 needs to be electrically connected to the protective circuit module 200 forming the charge-discharge path of the battery cell 100 to limit or break the charge-discharge path of the battery cell 100 in case of a malfunction such as overheating of the battery cell 100.

When the current breaking device 150 and the protective circuit module 200 are arranged on the same side of the terrace portion T, for example, on the first surface T1 of the terrace portion T, the terrace portion T is not arranged between the current breaking device 150 and the protective circuit module 200, and thus the current breaking device 150 and the protective circuit module 200 may be directly electrically connected to each other. In the structure of the present disclosure in which the current breaking device 150 and the protective circuit module 200 are respectively arranged on the second surface T2 and the first surface T1 of the terrace portion T which are opposite each other, the terrace portion T is arranged between the current breaking device 150 and the protective circuit module 200, and thus a connection member 160 may be added for electrical connection therebetween.

The connection member 160 may include first and second connection members 161 and 162. The first and second connection members 161 and 162 may be electrically connected to the first and second leads 151 and 152 of the current breaking device 150, respectively. More specifically, the first and second connection members 161 and 162 may extend from the first and second leads 151 and 152 to positions outside the terrace portion T, and may be electrically connected to the protective circuit module 200 at the positions outside the terrace portion T. That is, the connection member 160 serves as a medium for electrical connection between the current breaking device 150 and the protective circuit module 200, and since the current breaking device 150 and the protective circuit module 200 are respectively positioned on the second surface T2 and the first surface T1 of the terrace portion T which are opposite each other, the current breaking device 150 may be electrically connected to the protective circuit module 200 through the connection member 160 at a position outside the terrace portion T.

More specifically, the connection member 160 may be arranged on the second surface T2 of the terrace portion T together with the current breaking device 150, and the first and second connection members 161 and 162 respectively connected to the first and second leads 151 and 152 of the current breaking device 150 on the second surface T2 of the terrace portion T may extend to positions outside the terrace portion T and may then be connected to the protective circuit module 200.

The connection member 160 is arranged on the second surface T2 of the terrace portion T and extends to a position outside the terrace portion T, and the protective circuit module 200 is arranged on the first surface T1 of the terrace portion T and extends to the position outside the terrace portion T. In addition, the connection member 160 and the protective circuit module 200 may face each other at the position outside the terrace portion T without the terrace portion T being arranged therebetween and may then be electrically connected to each other. For example, the connection member 160 and the protective circuit module 200 may be coupled to each other through a thermal joining method such as welding or soldering.

The connection member 160 may include the first and second connection members 161 and 162 which are provided as a pair and are respectively connected to the first and second leads 151 and 152 of the current breaking device 150. The pair of the first and second connection members 161 and 162 are arranged on the second surface T2 of the terrace portion T, and to avoid electrical interference with the first and second electrode tabs 121 and 122 extending outward from the terrace portion T, the first and second connection members 161 and 162 may be arranged outside or between the first and second electrode tabs 121 and 122 which are provided as a pair. For example, the first connection member 161 of the pair of first and second connection members 161 and 162 may be arranged outside the pair of first and second electrode tabs 121 and 122; the second connection member 162 of the pair of first and second connection members 161 and 162 may be arranged between the first and second electrode tabs 121 and 122; and the pair of first and second connection members 161 and 162 may extend to positions outside the terrace portion T and may then be connected to the protective circuit module 200. For example, the first and second connection members 161 and 162 may extend side by side from the first and second leads 151 and 152 of the current breaking device 150 to positions outside the terrace portion T in the extending direction of the electrode tabs 120 perpendicular to the terrace portion T, and may then be connected to the protective circuit module 200.

Figure 6:
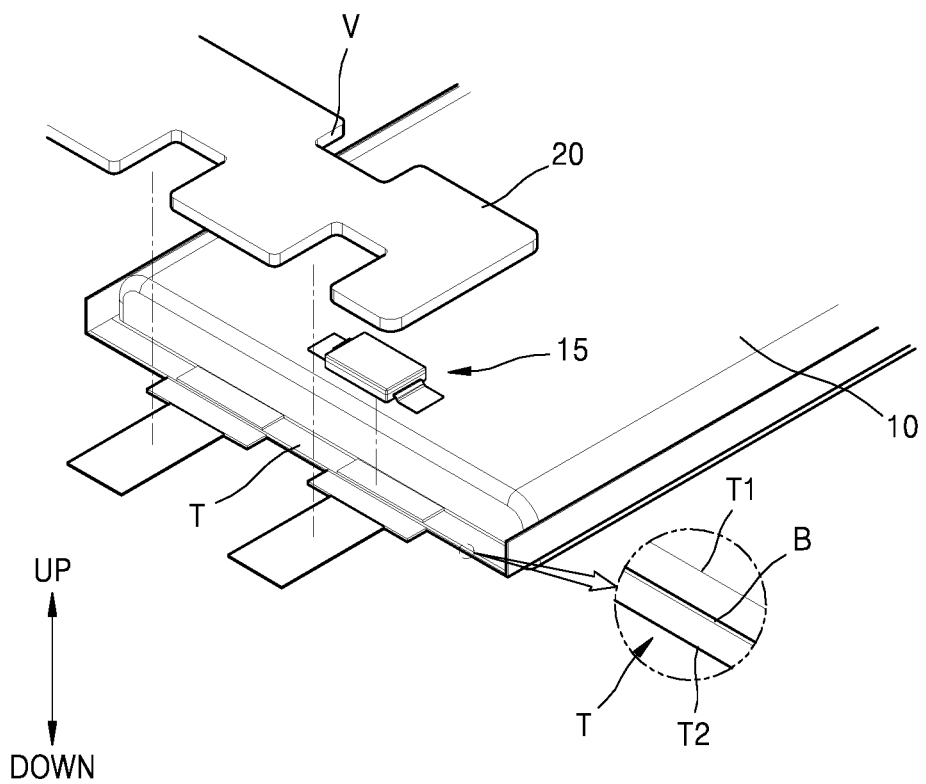
FIG. 6 is a view illustrating a battery pack according to a comparative example for comparison with the present disclosure.

FIG. 6 is a view illustrating a battery pack according to a comparative example for comparison with the present disclosure.

Referring to the drawing, the battery pack according to the comparative example may include a battery cell 10, a protective circuit module 20 electrically connected to the battery cell 10, and a current breaking device 15 arranged on a terrace portion T of the battery cell 10 together with the protective circuit module 20. In the battery pack according to the comparative example, the protective circuit module 20 and the current breaking device 15 are arranged on the same side on the terrace portion T of the battery cell 10, that is, on a first surface T1 of the terrace portion T.

That is, in the battery pack of the present disclosure, the protective circuit module 200 and the current breaking device 150 are respectively arranged on the first surface T1 and the second surface T2 of the terrace portion T which are opposite each other, but in the battery pack according to the comparative example, the protective circuit module 20 and the current breaking device 15 are arranged together on the first surface T1 of the terrace portion T.

In the comparative example, a mounting hole V for the current breaking device 15 is formed in the protective circuit module 20 to avoid spatial interference between the protective circuit module 20 and the current breaking device 15, and a conductive pattern (not shown) of the protective circuit module 20 is designed to bypass the mounting hole V. Since the mounting hole V for the current breaking device 15 is formed in the protective circuit module 20, the effective area of the protective circuit module 20 is decreased because of the mounting hole V, and thus it is needed to increase the width of the protective circuit module 20. For example, the protective circuit module 20 may include a conductive pattern (not shown) formed on a circuit board to form a charge-discharge path of the battery cell 10, and when the conductive pattern (not shown) is formed to protrude in the width direction of the protective circuit module 20 to bypass the mounting hole V, it is needed to increase the width of the protective circuit module 20 by an amount corresponding to the width of the mounting hole V formed for the current breaking device 15, thereby increasing the size of the battery pack.

In the present disclosure, since the current breaking device 150 and the protective circuit module 200 are respectively mounted on the second surface T2 and the first surface T1 of the terrace portion T which are opposite each other, it is not needed to additionally form a mounting hole to avoid spatial interference between the protective circuit module 200 and the current breaking device 150, and it is also not needed to design the conductive pattern (not shown) of the protective circuit module 200 to bypass a mounting hole, thereby decreasing the width of the protective circuit module 200 and enabling the battery pack to have a compact structure.

More specifically, in the present disclosure, it is not needed to form a mounting hole in the protective circuit module 200 for the current breaking device 150, and thus the protective circuit module 200 may have a flat lateral side in which a structure such as a hole or groove is not formed. That is, a lateral side of the protective circuit module 200 adjacent to the battery cell 100, that is, a lateral side of the protective circuit module 20 facing the accommodation portion (A) of the battery cell 100, may be formed flat without a structure such a hole or groove. Here, the expression "the lateral side of the protective circuit module 200 is formed flat" may mean that the lateral side of the protective circuit module 200 does not has a structure such as a hole or groove for receiving the current breaking device 150.

In the present disclosure, to electrically connect together the current breaking device 150 and the protective circuit module 200 which are respectively mounted on the second surface T2 and the first surface T1 of the terrace portion T which are opposite to each other, the connection member 160 extends from the current breaking device 150 and is connected to the protective circuit module 200 at a position outside the terrace portion T, thereby making it easy to electrical connect the current breaking device 150 and the protective circuit module 200 to each other.

The present disclosure has been described with reference to the embodiments shown in the accompanying drawings for illustrative purposes only, and it will be understood by those of ordinary skill in the art that various modifications and equivalent other embodiments may be made therefrom. Therefore, the scope and spirit of the present disclosure should be defined by the following claims.

INDUSTRIAL APPLICABILITY

The present disclosure may be applied to battery packs which are rechargeable energy sources, and to various devices using battery packs as power sources.

The invention claimed is:
1. A battery pack comprising:
   a battery cell comprising an electrode assembly to which electrode tabs are connected, and first and second casings that face each other and that are coupled to each other to form an accommodation portion for accommodating the electrode assembly and to form a terrace portion extending across the electrode tabs to seal the accommodation portion, the terrace portion comprising a first surface on the first casing and a second surface on the second casing;
   a protective circuit module electrically connected to the battery cell and arranged on the first surface of the terrace portion;
   a current breaking device electrically connected to the protective circuit module and arranged on the second surface of the terrace portion; and
   a connection member electrically connecting the current breaking device to the protective circuit module through, and comprising a portion positioned between, the electrode tabs.

2. The battery pack of claim 1, wherein the first and second casings respectively comprise first and second accommodation portions to accommodate different portions of the electrode assembly.

3. The battery pack of claim 2, wherein the first accommodation portion has a greater thickness than the second accommodation portion.

4. The battery pack of claim 1, wherein the current breaking device and the protective circuit module face each other with the terrace portion therebetween.

5. The battery pack of claim 1, wherein the connection member extends from the current breaking device to a position outside the terrace portion.

6. The battery pack of claim 5, wherein the protective circuit module is arranged on the first surface of the terrace portion and extends to the position outside the terrace portion.

7. The battery pack of claim 6, wherein the connection member and the protective circuit module are connected to each other at the position outside the terrace portion.

8. The battery pack of claim 1, wherein the current breaking device comprises a main body, and first and second leads connected to each other through the main body, and
wherein the connection member comprises first and second connection members respectively connected to the first and second leads.

9. The battery pack of claim 8, wherein the electrode tabs comprise first and second electrode tabs having different polarities,
wherein the first connection member is arranged outside the first and second electrode tabs, which are provided as a pair, and
wherein the second connection member is arranged between the first and second electrode tabs.

10. The battery pack of claim 8, wherein the first and second connection members extend side by side in an extending direction of the electrode tabs from the first and second leads of the current breaking device to positions outside the terrace portion.

11. The battery pack of claim 1, wherein the protective circuit module has a lateral side which faces the accommodation portion and is flat.

12. The battery pack of claim 1, wherein the battery cell comprises a plurality of battery cells, and
wherein the protective circuit module extends across the plurality of battery cells and is electrically connected to each of the plurality of battery cells.

13. The battery pack of claim 12, wherein the protective circuit module extends along terrace portions of the plurality of battery cells and is electrically connected to the electrode tabs respectively extending outward from the terrace portions of the plurality of battery cells.

14. The battery pack of claim 13, wherein the electrode tabs comprise first and second electrode tabs having different polarities, and
wherein the first and second electrode tabs extend outward from a corresponding one of the terrace portions and are connected to the protective circuit module.

15. The battery pack of claim 14, wherein the protective circuit module comprises first and second connection tabs which are coupled, in an overlapping manner, to the first and second electrode tabs extending outward from the corresponding one of the terrace portions, and are exposed to an outside through coupling holes.

16. The battery pack of claim 1, wherein the current breaking device is connected along a charge-discharge path of the battery cell to limit or break the charge-discharge path when the battery cell malfunctions.

17. A battery pack comprising:
a battery cell comprising an electrode assembly to which an electrode tab is connected, and first and second casings that face each other and that are coupled to each other to form an accommodation portion for accommodating the electrode assembly and to form a terrace portion extending across the electrode tab to seal the accommodation portion, the terrace portion comprising a first surface on the first casing and a second surface on the second casing;
a protective circuit module electrically connected to the battery cell and arranged on the first surface of the terrace portion; and
a current breaking device electrically connected to the protective circuit module through a connection member, arranged on the second surface of the terrace portion, and comprising a main body, and first and second leads connected to each other through the main body,
wherein the connection member comprises first and second connection members respectively connected to the first and second leads.

18. The battery pack of claim 17, wherein the electrode tab comprises first and second electrode tabs having different polarities,
wherein the first connection member is arranged outside the first and second electrode tabs which are provided as a pair, and
wherein the second connection member is arranged between the first and second electrode tabs.

19. The battery pack of claim 17, wherein the first and second connection members extend side by side in an extending direction of the electrode tab from the first and second leads of the current breaking device to positions outside the terrace portion.

* * * * *